United States Patent [19]

Van der Schoot

[11] 4,073,683

[45] Feb. 14, 1978

[54] BORON CONTROL SYSTEM FOR A NUCLEAR POWER PLANT

[75] Inventor: Martinus R. Van der Schoot, Swissvale, Pa.

[73] Assignee: Westinghouse Electric Corporation, Pittsburgh, Pa.

[21] Appl. No.: 362,989

[22] Filed: May 22, 1973

Related U.S. Application Data

[63] Continuation of Ser. No. 38,711, May 19, 1970, abandoned.

[51] Int. Cl.² ............................................. G21C 7/00
[52] U.S. Cl. ................................. 176/86 L; 176/22; 176/37
[58] Field of Search ....................... 176/86 L, 22, 37

[56] References Cited

U.S. PATENT DOCUMENTS

| | | | |
|---|---|---|---|
| 3,365,367 | 1/1968 | Dolle | 176/86 L |
| 3,378,450 | 4/1968 | Gramer et al. | 176/86 L |
| 3,380,889 | 4/1968 | Loose | 176/86 L |
| 3,666,626 | 5/1972 | Gramer et al. | 176/86 L |

FOREIGN PATENT DOCUMENTS

| | | | |
|---|---|---|---|
| 1,080,794 | 8/1967 | United Kingdom | 176/86 L |

*Primary Examiner*—Harvey E. Behrend
*Attorney, Agent, or Firm*—Z. L. Dermer; J. R. Campbell

[57] ABSTRACT

Two sets of ion exchangers or other means which are capable of reversibly storing borate ions are continuously or semi-continuously utilized to provide a nuclear reactor with a supply of both a highly concentrated boric acid solution and a solution having a very low concentration of boron. The process is essentially a timed-two-cycle flow scheme. During the first cycle, fluid is sent from a high concentration storage tank via a cooler and a first set of ion exchanger to a low concentration storage tank while simultaneously sending fluid from a low concentration storage tank via a heater and a second set of ion exchanger to the high concentration storage tank. During the second cycle, the flow through the ion exchangers is reversed such that the flow from the high concentration storage tank which has been cooled is sent to the low concentration storage tank via the second set of ion exchangers, and the flow from the low concentration storage tank which has been heated is sent to the high concentration storage tank via the first set of heat exchangers. The two-cycle flow scheme is repeated continuously or as often as necessary to obtain the proper concentration in the two storage tanks.

5 Claims, 4 Drawing Figures

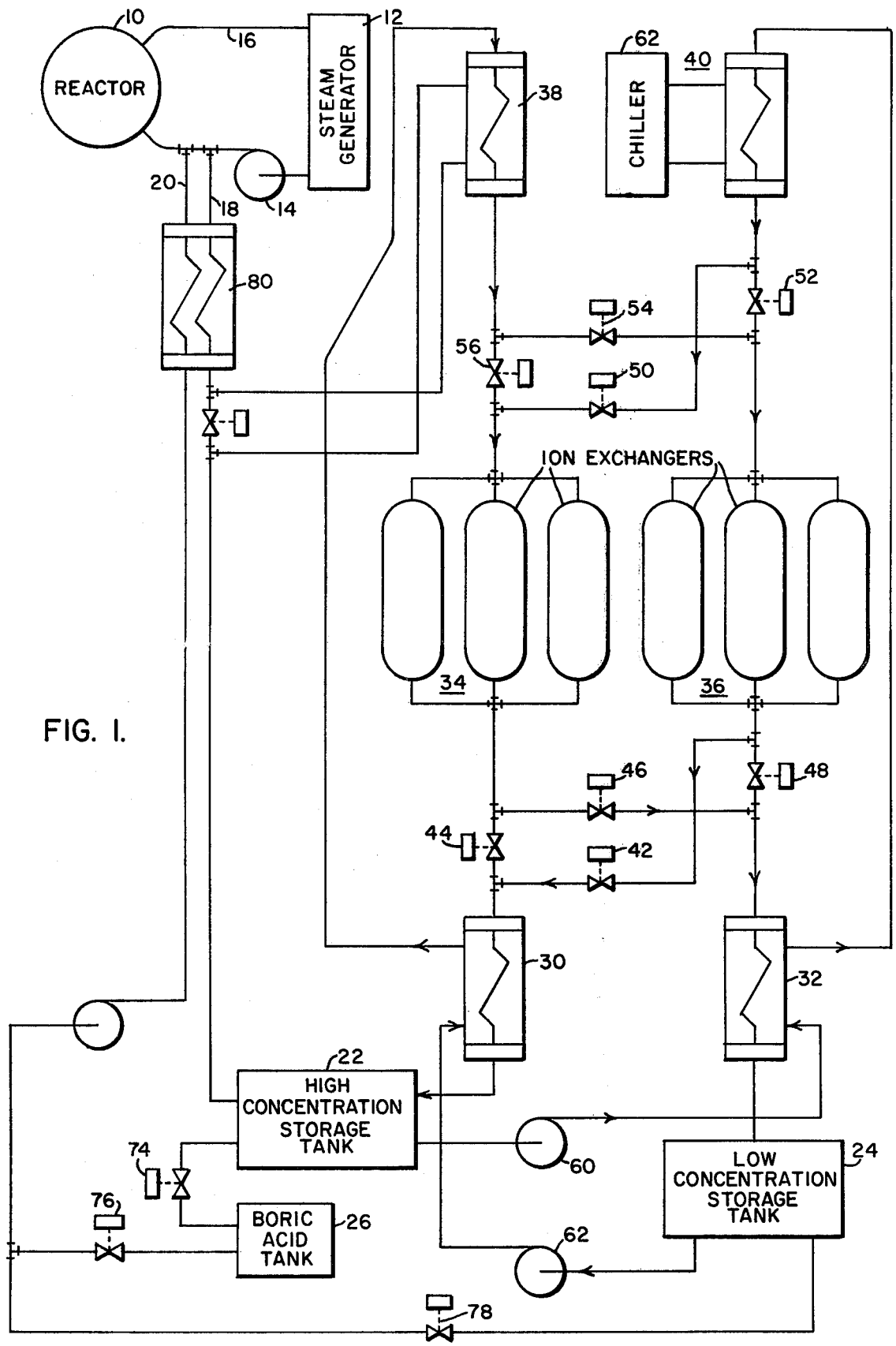
FIG. I.

BORON CONTROL SYSTEM FOR A NUCLEAR POWER PLANT

This is a continuation, of application Ser. No. 38,711 filed May 19, 1970, now abandoned.

BACKGROUND OF THE INVENTION

This invention pertains to the control of the homogeneously dispersed neutron absorbing material within nuclear reactors, and more particularly to a process for maintaining an inventory of both highly concentrated and dilute boric acid solution for injection into a nuclear reactor.

A copending application 2797 filed Jan. 14, 1970 by William W. Brown et al describes a boron control system which is believed to repesent the latest pertinent prior art. This system utilizes a combination of sequentially operated ion exchange beds and an evaporative boric acid recovery apparatus to process the coolant from a nuclear reactor and to adjust the boron level to that required for a particular operation. As therein described, the ion exchange beds are provided for load follow operations, and the evaporative apparatus is provided for major changes in boron concentration. Inherent in the description of the invention was the belief the ion exchange beds of any practical volume could not handle major changes in boron concentration.

As is well known, an evaporative boric acid recovery system requires numerous supplemental systems to process the gases which are released from the fluid during heating. Moreover, some portion of these gases which contain fission products eventually are released to the environment.

Another copending application No. 791,893 filed Jan. 17, 1969 by Gottfried Gramer and Gunter Wittrowsky describes a system having only ion exchangers. However, this system is of impractical size for commercial operations.

Accordingly, it becomes highly desirable, especially in view of the emphasis on environmental control, to provide an ion exchange system capable of handling all changes in boron concentration required for all necessary changes in boron concentration.

SUMMARY OF THE INVENTION

The evaporative apparatus can be eliminated from present boron control systems by providing two sets of ion exchangers operated in accordance with a timed-two-cycle flow scheme of this invention.

The first cycle is utilized to, respectively, store borate ions in a first set of ion exchangers and to rinse borate ions from a second set of ion exchangers. Liquid from the high concentration storage tank is cooled and conveyed through the first set of ion exchanger to deposit borate ions therein and thus provide a liquid of low boron concentration at the first ion exchanger outlet which is then discharged to the low concentration storage tank. Simultaneously, liquid of low boron concentration is conveyed from the low concentration storage tank via a heater through the second set of ion exchanger to flush borate ions therefrom and thus provide a liquid of high boron concentration at the second ion exchanger outlet which is then discharged to the high concentration storage tank. Moreover, since the ion exchangers store and release boron dependent not only upon the temperature of the through-put but also upon the concentration of borate ions in the throughput, the fluid conveyed to the low concentation storage tank has had a high proportion of the boron removed therefrom while the fluid conveyed to the high concentration storage tank is highly enriched in boron.

The second cycle is utilized to rinse the previously stored boron from the first set of ion exchangers into the high concentration tank and to store the boron in the liquid from the high concentration storage tank in the second set of ion exchangers while the dilute flow is conveyed to the low concentration storage tank. The flow is accordingly reversed such that the cooled liquid from the high concentration storage tank is conveyed through the second set of ion exchangers to the low concentration storage tank and the heated liquid from the low concentration storage tank is conveyed through the first set of heat exchangers to the high concentration storage tank.

The above two-cycle process is repeated as often as necessary to reach any desired concentration of boron solution in the high concentration storage tank and dilution in the low concentration storage tank. Each cycle and each repetition of the two-cycle process acts somewhat like an automobile jack where each cyclic repetition is levered from a previous level to a different level. To fully understand this statement, it is necessary to realize that the hot-flow and cooled-flow conditions are essentially constant, and that what occurs in each ion exchanger depends primarily upon how much boron is stored therein and how much boron is in the through-put. Accordingly, the first cycle may be viewed as adjusting the storage levels to advantageous concentrations for maximum efficiency from the second cycle. Further, each repetition of the process finds the concentration levels higher in the high concentration storage tank and lower in the low concentration storage tank. Therefore, the process is successively more efficient.

DESCRIPTION OF THE DRAWINGS

For a better understanding of the invention, reference may be had to the accompanying illustrative drawings, in which:

FIG. 1 shows in a flow diagram of the process of this invention;

DESCRIPTION OF A PREFERRED EMBODIMENT

Figure 3:
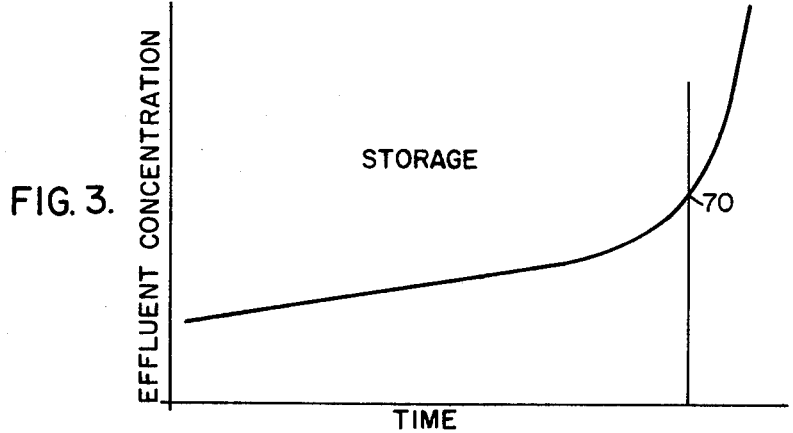
FIG. 3 is a graph indicating the time rate of storage of boron in an ion exchanger.

Referring to FIG. 1, which shows a general arrangement of the boron handling system in accordance with this invention, there is shown a nuclear reactor 10 having a plurality of closed primary coolant loops associated therewith. For illustrative purposes, only one of these coolant loops is shown; each loop contains a steam generator 12, a primary coolant pump 14 and a closed cycle coolant conduit 16, as is well known in the art. Letdown flow lines 18 and 20 are connected to the cold leg of the closed-loop conduit 16 between the primary coolant pump 14 and the reactor 10. Fluid withdrawn from the primary coolant loop 16 is conveyed through conduit 18 to a high concentration storage tank 22.

The fluid in the high concentration tank 22 is continuously or semicontinuously conveyed through an ion exchange system to low concentration storage tank 24 and back again while the concentrations in both the high concentration storage tank 22 and the low concentration storage tank 24 are adjusted to the most advantageous levels. The fluid may then be conveyed from either the high concentration storage tank, or more particularly a boric acid storage tank 26 utilized to give the system increased storage capacity, or from the low concentration storage tank 24 through conduit 20 back into the primary coolant loop 16.

The ion exchange system primarily comprises a preheater 30, a precooler 32, a first set of ion exchangers 34, s second set of ion exchangers 36, a heater 38 and a cooler 40. The direction of the flow throughout this system is changed in accordance with a predetermined time sequence to provide both a supply of highly concentrated boric acid in the high concentration storage tank 22 and a supply of very dilute boric acid in storage tank 24.

Figure 4:
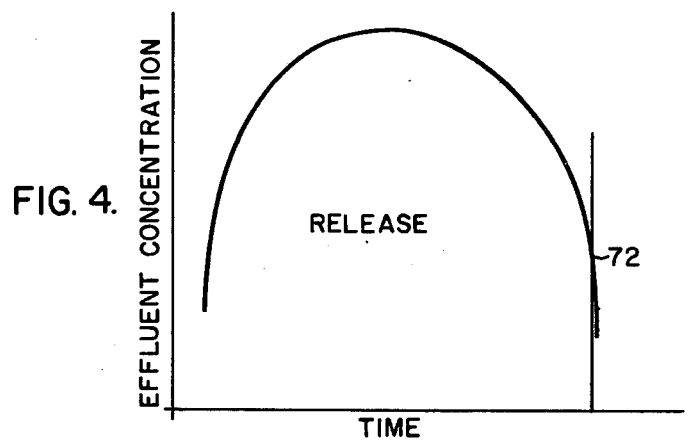
FIG. 4 is a graph indicating the time rate of release of boron from an ion exchanger.
Figure 2:
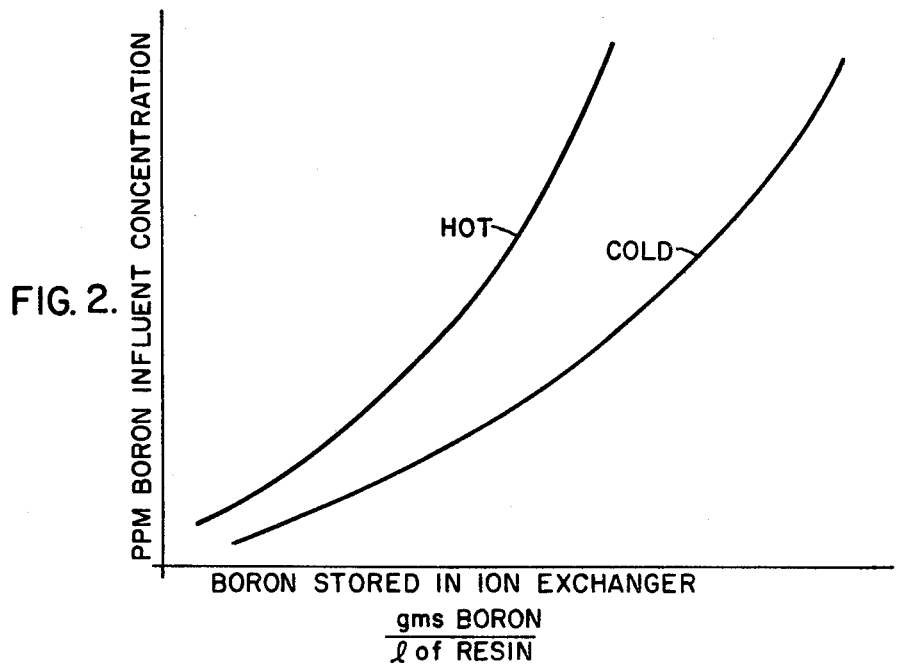
FIG. 2 is a graph of PPM level of boron in the influent versus boron stored in an ion exchanger.

Before describing the flow pattern utilized to obtain this result, it is first necessary to note certain features of the ion exchange beds 34 and 36. With reference to FIG. 2, it can be seen that more borate ions are stored in an ion exchanger having a cooling influent than one having a hot influent. It can also be noted by studying the graph of PPM level of influent versus boron stored in the ion exchanger that greater storage is obtained at higher PPM levels than at lower PPM levels and vice versa. Accordingly the higher concentration of boron in the flow coming into an ion exchanger the more boron which will be removed and stored on the ion bed. FIG. 3 shows that an exchanger will store an almost constant amount of boron from the fluid passing therethrough for a period of time and then as it becomes saturated the boron which passes through the bed and into the effluent goes up markedly. FIG. 4 indicates that the boron released from an ion exchange bed having a hot through-put goes up very rapidly and then goes down rapidly as the boron in the bed is decreased. From the graphs of FIGS. 3 and 4 the time sequence for the two-cycle process of varying the boron concentration in high concentration storage tank and the low concentration storage tank can be calculated as is known in the art.

As previously indicated the process of this invention proceeds in a two-cycle manner with the flow from each storage tank being switched between the ion exchangers 34 and 36. Two sets of remotely operated valves are utilized to perform this function. The first set comprises valves 42, 44, 46 and 48 and the second set of valves 50, 52, 54 and 56. During the first cycle valves 42, 46, 50 and 54 are opened and valves 44, 48, 52 and 56 are closed. The liquid then proceeds from the high concentration storage tank 22 via a pump 60 through a precooler 32 through the cooler 40 kept cold by a chiller 62, by way of valve 50 to ion exchangers 34 which removes boron therefrom and then by way of valve 46 and the tubing of precooler 32 to the low concentration storage tank 24. Simultaneously, the liquid from the low concentration storage tank 24 is conveyed via pump 62 through a preheater 30, a heater 38, and by way of valve 54 to the ion exchangers 36 which add boron to the liquid passing therethrough, and then by way of valve 42 and the tubing of the preheater 30 to the high concentration storage tank 22.

At the end of the above-described cycle of the timed-two-cycle process, assuming the boron concentration in the ion exchangers 34 and 36 were approximately equal and the concentrations in the storage tanks 22 and 24 were equal at the beginning of the cycle, it should be clear that the concentration in the high concentration storage tank 22 has been raised since boron was rinsed out of the ion exchangers 36. Further, since boron in the flow proceeding from the high concentration storage tank 22 has been stored in the ion exchangers 34, the influent to the low concentration storage tank 24 is lower than its initial level.

After a predetermined amount of liquid has been exchanged between the tanks 22 and 24 which may be regulated by adjusting the flow rate through the ion exchangers 34 and 36 so that the elapsed time to point 70 on the graph of FIG. 3 and to point 72 on the graph of FIG. 4 are approximately equal, the flow is reversed. In order to reverse the flow, the valves 42, 46, 50 and 54 are closed while the valves 44, 48, 52 and 56 are opened. Accordingly the flow from the high concentration storage tank 22 is precooled in cooler 32 further cooled by the chiller 40 as before, but is sent through the ion exchanger 36 before entering the low concentration storage tank 24. In a similar manner the flow from the low concentration storage tank 24 is once again preheated by the heater 30, heated to a higher degree by a heater 38, but switched into the ion exchanger 34 before entering the high concentration storage tank 22. This cycle also results in the concentration of boron in the high concentration tank 22 being raised and the concentration of boron in the low concentration tank 24 being lowered. This occurs because additional boron was stored in the ion exchangers 36 before the flow was conveyed to the low concentration storage tank 24 - the ion exchangers 36 having been rinsed during the first cycle of this repetition so as to increase their storage capacity. In like manner, the concentration in high concentration tank 22 goes up markedly since the ion exchangers 34 were rinsed of substantial portion of their boron which was stored during the first cycle of this repetition.

The regulation of the second cycle is determined in the same manner as that of the first cycle, and the valves are reset to their initial positions.

It should accordingly be clear that by providing two sets of ion exchangers 34 and 36 and by conveying the cooled fluid from the high concentrations storage tank 22 back and forth between the two ion exchangers 34 and 36, and by switching the heated fluid from the low concentration storage tank back and forth between the two sets of ion exchangers 34 and 36, that each cycle in each repetition of the timed-two-cycle process causes the concentration in the high concentration storage tank 22 to be successively raised and the concentration and the low concentration storage tank 24 to be sucessively lowered. This process can essentially be continued until the concentration in the low concentration storage tank 24 reaches zero.

As previously mentioned the high concentration storage tank 22 is periodically letdown through a valve 74 into a boric acid tank 26 so as to provide some flexibility in storage for the system. In operating the reactor, and more particularly in changing the concentration of boron therein, valves 76 and 78 may be utilized to alternately inject high concentration boric acid through the line 20 into the nuclear reactor or low concentration boric acid by way of valve 78 and line 20 into the reactor. It may be further noted that both lines are associated through a regenerative heat exchanger 80 which conserves the total energy of the system.

Many modifications may be made to the disclosed process within the scope of this invention. The reactor 10, itself, may be utilized periodically as the high concentration storage tank and periodically as the low concentration storage tank, as operating conditions dictate. Thus, when operating conditions necessitate higher and higher boron concentration within the reactor 10, for example, the reactor 10 may be utilized as the high concentration storage tank. This system would then require only one storage tank which would serve as the high concentration storage tank when reactor was operating in a mode which requires less boron, and the low concentration storage tank when the reactor requires more boron. The flow pattern would be the same as that previously described with conduits and valves added to allow the functions (high concentration storage or low concentration storage) to be switched between the reactor 10 and the single storage tank.

The method might also be effectively practiced with a single ion exchanger or a single set of ion exchangers. The flow would then continuously alternate between: high concentration storage tank to heater to ion exchanger to low concentration storage tank, and low concentration storage tank to cooler to ion exchanger to high concentration storage tank. The process would still operate with each cycle rinsing or storing boron such that the next cycle would be more effective than would otherwise be the case.

Further, a combination of the above modification could be utilized where the goal is to practice the invention with a minimum of equipment.

I claim as my invention:

1. Apparatus for providing an inventory of both a concentrated solution of a neutron capturing material and a dilute solution of same for control of a nuclear reactor, which comprises:

a first vessel and a second vessel connected to said reactor, each vessel having a solution containing neutron capturing material:

at least two ion exchangers being temperature dependent with respect to their storage capacity of neutron capturing material;

conduits connecting the vessels with said ion exchangers;

a heater and pump in the conduit between the first vessel and a first of said ion exchangers, said heater imparting heat to a solution circulated from the first vessel to the first ion exchanger wherein the solution rinses neutron capturing material from the ion exchanger during its flow therethrough thus increasing the concentration of neutron capturing material therein; and means connecting the discharge side of said first ion exchanger to said second vessel for discharging the solution of higher concentration thereinto;

a cooler and pump in the conduit between the second vessel and the second ion exchanger, said cooler extracting heat from a solution circulated from the second vessel to the second ion exchanger wherein the solution gives up neutron capturing material and stores it in the second ion exchanger thus decreasing the concentration of neutron capturing material in said solution; and means connecting the discharge side of said second ion exchanger with the first vessel for discharging the solution of lower concentration thereinto and; separate means are connected to opposite sides of said first and second ion exchangers for selectively diverting the solutions from the heater and cooler respectively to said second and first ion exchangers, and from the outlet of said second and first ion exchangers respectively to the second and first vessels; thereby providing separate solutions of low and high neutron capturing material respectively in the first and second vessels to be separately supplied to said reactor according to reactor requirements.

2. The apparatus of claim 1 wherein one of said vessels comprises a reactor vessel.

3. The apparatus of claim 1 including
conduits connecting both vessels to said reactor; and
valve means in said conduits whereby said solution may be letdown into one of the vessels and replaced from either vessel.

4. Apparatus for providing an inventory of both a concentrated solution of a neutron capturing material and a dilute solution of same for control of a nuclear reactor, which comprises:

a first vessel and a second vessel connected to said reactor, each vessel having a solution containing neutron capturing material:

at least two ion exchangers being temperature dependent with respect to their storage capacity of neutron capturing material;

conduits connecting the vessels with said ion exchangers;

a heater and pump in the conduit between the first vessel and a first of said ion exchangers, said heater imparting heat to a solution circulated from the first vessel to the first ion exchanger wherein the solution rinses neutron capturing material from the ion exchanger during its flow therethrough thus increasing the concentration of neutron capturing material therein; and means connecting the discharge side of said first ion exchanger to said second vessel for discharging the solution of higher concentration thereinto;

a cooler and pump in the conduit between the second vessel and the second ion exchanger, said cooler extracting heat from a solution circulated from the second vessel to the second ion exchanger wherein the solution gives up neutron capturing material and stores it in the second ion exchanger thus decreasing the concentration of neutron capturing material in said solution; and means connecting the discharge side of said second ion exchanger with the first vessel for discharging the solution of lower concentration thereinto; and conduit means connecting said heater and cooler respectively with the inlet to said second and first ion exchangers; and conduit means connecting the outlet of said second and first ion exchangers respectively with said second and first vessels;

valve means in said conduits and conduit means for selectively switching the solution from the heater outlet to said second ion exchanger to rinse neutron capturing material from the second ion exchanger during its flow therethrough prior to discharging it to the high concentration second vessel, and for selectively switching the solution from the cooler outlet to said first ion exchanger to store neutron capturing material in said first ion exchanger during its flow therethrough prior to discharging it to the low concentration first vessel;

thereby providing separate solutions of low and high neutron capturing material respectively in the first and second vessels to be separately supplied to said reactor according to reactor requirements.

5. A process for maintaining an inventory of both a concentrated solution of a neutron capturing material and a dilute solution of same for use in a nuclear reactor, which comprises:

circulating a liquid having the neutron capturing material therein from a high concentration first vessel through a cooler and a first ion exchanger to store at least a portion of said material therein then discharging the thus diluted liquid to a low concentration second vessel;

simultaneously circulating liquid having neutron capturing material therein from the low concentration second vessel through a heater and a second ion exchanger to flush neutron capturing material from the second ion exchanger then discharging the thus concentrated liquid to said high concentration first vessel;

subsequently circulating said liquid then contained in said high concentration first vessel from said first vessel through the cooler and the second ion exchanger to store at least a portion of said material therein prior to discharging the thus diluted liquid to said low concentration second vessel;

simultaneously circulating said liquid then contained in said low concentration second vessel from the second vessel through the heater and the first ion exchanger to flush neutron capturing material from the first ion exchanger prior to discharging more concentrated the liquid to said high concentration first vessel; and selectively supplying liquid from said high concentration first vessel as said low concentration second vessel to said nuclear reactor according to the requirements of said reactor.

* * * * *